Oct. 7, 1969     L. N. GEE ET AL     3,471,042
SECTIONAL RETRACTABLE FLUX-CHARGING CHUTE
FOR OXYGEN STEEL-MAKING VESSEL
Filed Oct. 4, 1967     2 Sheets-Sheet 1
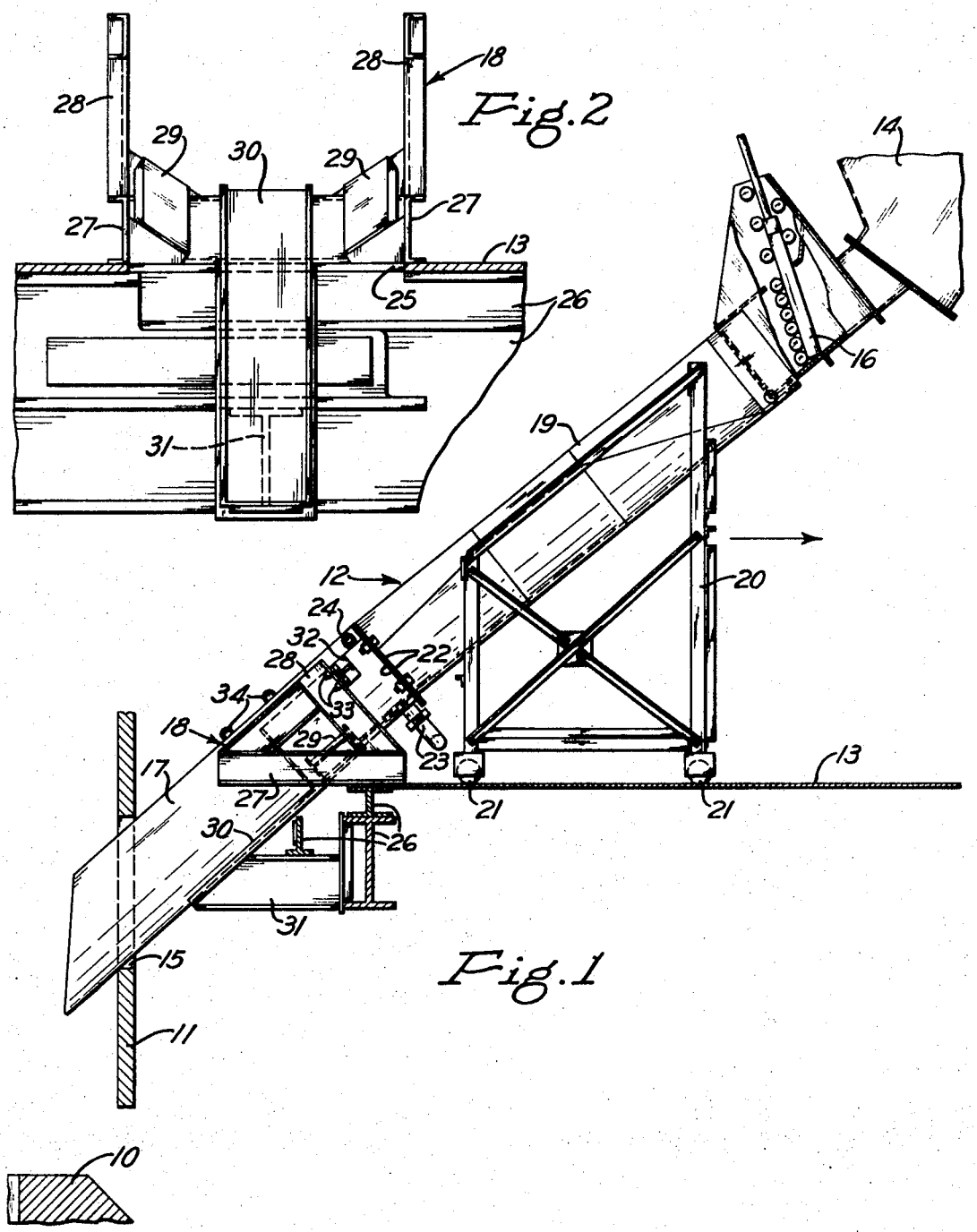
INVENTORS.
LAWRENCE N. GEE
VERNON A. JONES
BY
ATTORNEY.

Oct. 7, 1969   L. N. GEE ET AL   3,471,042
SECTIONAL RETRACTABLE FLUX-CHARGING CHUTE
FOR OXYGEN STEEL-MAKING VESSEL
Filed Oct. 4, 1967   2 Sheets-Sheet 2
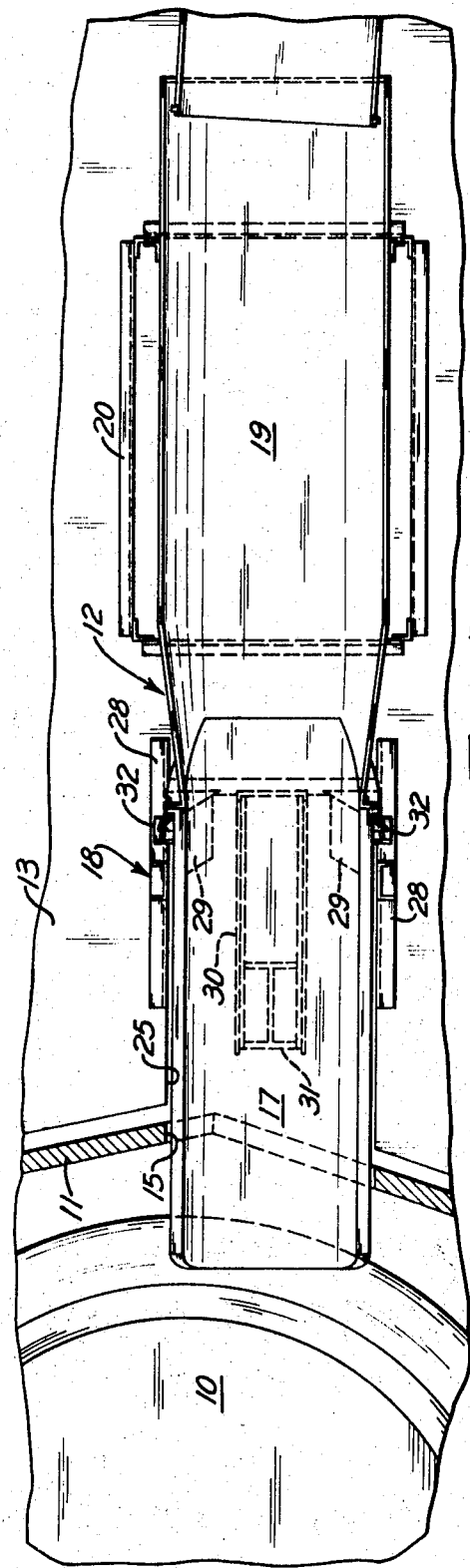
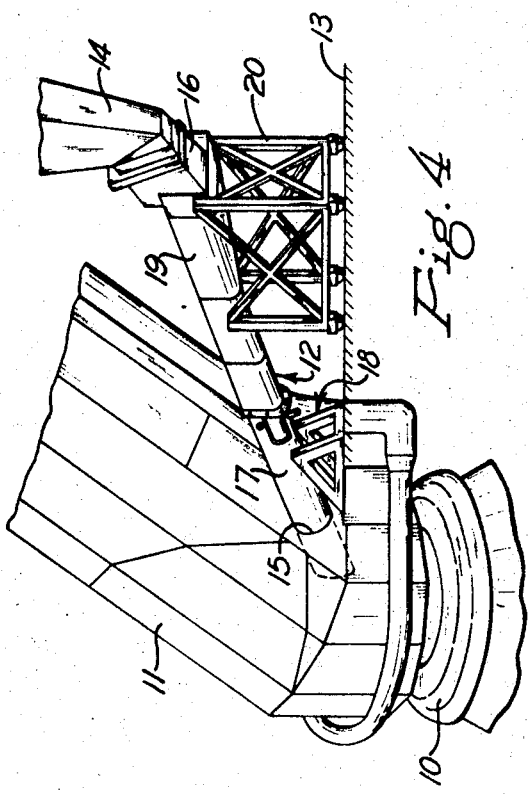
INVENTORS.
LAWRENCE N. GEE
VERNON A. JONES
BY
Donald G. Dalton
ATTORNEY.

United States Patent Office 3,471,042
Patented Oct. 7, 1969

3,471,042
SECTIONAL RETRACTABLE FLUX-CHARGING CHUTE FOR OXYGEN STEEL-MAKING VESSEL
Lawrence N. Gee, 324 Crestwood Drive, Hobart, Ind. 46342, and Vernon A. Jones, 1401 E. 50th Court, Gary, Ind. 46409
Filed Oct. 4, 1967, Ser. No. 672,886
Int. Cl. F23k 3/00; B66c 17/08
U.S. Cl. 214—35       4 Claims

ABSTRACT OF THE DISCLOSURE

A chute for conveying flux from an overhead hopper to the mouth of an oxygen steel-making vessel when in upright position is constructed in two separable alined sections. The upper section is mounted for traveling movement horizontally on a deck intermediate the hopper and vessel, from and to the hopper spout and is free to move away from the latter. The lower section is liftably mounted in a saddle resting on the deck and may be lifted by a crane to an out-of-the-way position when repairs or relining of the vessel becomes necessary.

BACKGROUND OF THE INVENTION

This invention relates to the manufacture of steel by the oxygen-blowing process and, in particular, to means for introducing flux into the tilting vessel conventionally employed therein.

Vessels for making steel by the oxygen-blowing process are mounted on trunnions to permit the product to be discharged by downtilting. Hot metal and scrap are charged into the vessel while it is in a position intermediate the upright blowing position and the downtilted pouring position. Flux is charged only after a limited period of operation in the upright position following the charging of hot metal and scrap. Difficulty arises in so doing because the mouth of the vessel, when in upright position, is entirely covered by the lower end of the exhaust hood which is required to collect the heavy effluent fume produced in the process. The problem is complicated by the limited head room existing above the mouth of the vessel and the need for providing a clear working space around the vessel when shut down for repair or relining.

Motorized sectional retractable chutes have been employed heretofore but vibrators have been required to cause flux to flow downwardly therealong. Such chutes have not been satisfactory because of the high maintenance involved and the dust created.

SUMMARY OF THE INVENTION

We have invented an improved chute for conveying flux from a storage hopper to the vessel mouth. Our chute comprises a lower water-cooled section removably supported in a fixed saddle, with its lower end projecting over the vessel mouth, and upper retractable section detachably connected to the upper end of the lower section and having its upper end disposable below the discharge gate of the hopper. A wheeled frame supports the upper section and permits it to be retracted to an out-of-the-way position.

BRIEF DESCRIPTION OF DRAWINGS

A complete understanding of the invention may be obtained from the following detailed description and explanation which refer to the accompanying drawings illustrating the present preferred embodiment. In the drawings:

FIGURE 1 is a side elevation with parts in section;
FIGURE 2 is an end elevation of the saddle;
FIGURE 3 is a plan view; and
FIGURE 4 is a diagrammatic perspective view.

DESCRIPTION OF THE PREFERRED

Referring now in detail to the drawings, and, for the moment, particularly to FIGURE 4, an oxygen steel-making vessel 10, when in the upright position shown, has its mouth in registry with the lower end of an upwardly extending fume-collector hood 11. A flux-charging chute, indicated generally at 12, is supported on a deck 13, for conducting flux material from an overhead storage hopper having a spout 14 to the vessel mouth. To this end, the hood has a hole 15 adjacent its lower end which receives and makes a rather close fit with the lower end of chute 12. A slide gate 16 of conventional construction, controls the flow of metal from spout 14 to chute 12.

Our improved chute 12 comprises a lower water-cooled section 17, liftably seated in a supporting saddle 18, and an upper retractable section 19 carried on a wheeled supporting frame 20. This frame is adapted to travel on deck 13 from right to left and back, as viewed in FIGURE 1, by virtue of wheels 21 journaled therein. Sections 17 and 19 are of U-shape and are detachably secured together in alinement by bolts inserted through abutting flanges 22 on their adjacent ends. At its upper end, section 17 is provided with a cooling water inlet 23 and outlets 24 to which hose connections are made by conventional quickly detachable couplings.

Deck 13 is slotted at 25 to accommodate section 17 and a saddle 18 straddles the slot 25 as shown in FIGURE 2. The deck is carried on building frame members some of which are shown at 26. Saddle 18 has parallel base stringers 27 and A-frames 28 standing thereon. Inclined bottom plates 29 and a downwardly extending tongue 30 therebetween afford a firm seat for releasably supporting section 17. A brace 31 extends from frame members 26 to tongue 30. Brackets 32 are secured on the sides of section 17 adjacent the upper end arresting downward movement and thereof for the detachable securement of the section to A-frames 28 by bolts 33. Eyes 34 are mounted on the sides of section 17 near its upper end for the attachment of lifting means for a purpose which will appear shortly.

Upper chute section 19 is simply an open U-shaped trough of plate construction, except that its upper end is of rectangular section to fit rather closely about the lower end of gate 16 with freedom to go and come on lateral movement. The relation of these parts is such that when the bolts are removed from flanges 22, frame 20, with section 19 thereon, is free to be moved to the right, to the extent necessary to clear the space adjacent hood 11, section 19 coming readily away from section 17 and gate 16. When this has been effected, section 17 may be lifted by engaging eyes 34 with hooks or slings, after connections to inlet 23 and outlets 24 have been broken and bolts 33 removed, section 17 being otherwise free to rise from saddle 18. By this means, chute 12, which remains in the illustrated position during normal operation of vessel 10, may be entirely disposed out of the way when the vessel is shut down for repair or relining.

The advantages of our chute construction are that it reduces maintenance to a minimum and conducts flux material in a fast steady stream without raising an excessive amount of dust. In addition the construction is simple, easy to set in place or remove and creates a minimum obstruction in the area overhead the vessel.

We claim:
1. Apparatus for conveying flux material from a hopper having a discharge spout to the mouth of a steel- making vessel at a lower level comprising a chute including a lower section and an upper section separably connected end to end, a supporting deck at a level intermediate those of said spout and said vessel mouth, a saddle on said deck receiving said lower section and supporting it for upward removal, and a supporting frame adapted to move on said deck from and toward said saddle, said upper section being secured to said frame, the upper end of the upper section being adapted to break and make receiving relation with said spout solely as a result of such movements, respectively.

2. Apparatus as defined in claim 1 characterized by said saddle having a seat inclined downwardly toward said mouth, said lower section fitting snugly in said seat.

3. Apparatus as defined in claim 2, characterized by means on said lower section engageable with said saddle to arrest downward movement of said lower section in said seat.

4. Apparatus as defined in claim 1, characterized by said deck having a slot therein to accommodate the lower end of said lower section.

References Cited

UNITED STATES PATENTS 3,219,209  11/1965  Blaine _____ 214—35

ANDRES H. NIELSEN, Primary Examiner